United States Patent
Sasser et al.

(10) Patent No.: US 7,452,218 B2
(45) Date of Patent: Nov. 18, 2008

(54) GROUNDING CLIP FOR GROUNDING A PRINTED CIRCUIT BOARD IN A TRANSCEIVER MODULE

(75) Inventors: Gary D. Sasser, San Jose, CA (US); Chris Togami, San Jose, CA (US)

(73) Assignee: Finisar Corporation, Sunnyvale, CA (US)

( * ) Notice: Subject to any disclaimer, the term of this patent is extended or adjusted under 35 U.S.C. 154(b) by 0 days.

(21) Appl. No.: 11/689,351

(22) Filed: Mar. 21, 2007

(65) Prior Publication Data

US 2007/0237489 A1   Oct. 11, 2007

Related U.S. Application Data

(60) Provisional application No. 60/784,302, filed on Mar. 21, 2006.

(51) Int. Cl.
*H01R 4/66* (2006.01)
*H01R 13/648* (2006.01)

(52) U.S. Cl. .......................................... 439/92; 439/95

(58) Field of Classification Search .................... 439/92, 439/95, 101, 108, 160, 372
See application file for complete search history.

(56) References Cited

U.S. PATENT DOCUMENTS

| | | | | |
|---|---|---|---|---|
| 4,983,127 | A | * | 1/1991 | Kawai et al. .................... 439/79 |
| 5,062,811 | A | * | 11/1991 | Hackman ................ 439/620.03 |
| 5,321,372 | A | | 6/1994 | Smith |
| 6,335,869 | B1 | | 1/2002 | Branch et al. |
| 6,439,918 | B1 | | 8/2002 | Togami et al. |
| 6,459,517 | B1 | | 10/2002 | Duncan et al. |
| 6,533,603 | B1 | | 3/2003 | Togami |
| 6,705,879 | B2 | | 3/2004 | Engel et al. |
| 6,731,510 | B1 | * | 5/2004 | Hwang et al. ................ 361/754 |
| 6,744,639 | B1 | * | 6/2004 | Branch et al. ................ 361/818 |
| 6,778,399 | B2 | * | 8/2004 | Medina et al. ............... 361/729 |
| 6,817,782 | B2 | | 11/2004 | Togami et al. |
| 6,863,448 | B2 | * | 3/2005 | Chiu et al. ..................... 385/88 |
| 6,935,882 | B2 | * | 8/2005 | Hanley et al. ................ 439/372 |
| 6,953,289 | B2 | | 10/2005 | Togami et al. |
| 7,114,857 | B1 | * | 10/2006 | Kayner et al. .................. 385/88 |

(Continued)

OTHER PUBLICATIONS

Small Form-factor Pluggable (SFP) Transceiver Multisource Agreemenet (MSA), Cooperation Agreement for Small-Form-factor Pluggable Transceivers, Agilent Technologies, et al., Sep. 14, 2000.

(Continued)

*Primary Examiner*—Hae Moon Hyeon
(74) *Attorney, Agent, or Firm*—Workman Nydegger (57) ABSTRACT

A transceiver module that utilizes an apparatus for providing chassis ground to a printed circuit board located within a connector structure of the transceiver module. In one example embodiment, a ground clip for use in a transceiver module includes a cross-arm, a pair of arms connected to the cross-arm, a pair of fingers each connected to one of the pair of arms, and at least one protrusion connected to the cross-arm. Each finger is configured to be inserted into a hole in a connector structure and configured to be electrically connected to ground contacts of a printed circuit board. The at least one protrusion is configured to bias against, and make reliable electrical contact with, a portion of a transceiver module that is electrically connected to a housing of the transceiver module.

20 Claims, 5 Drawing Sheets

U.S. PATENT DOCUMENTS

2004/0161958 A1     8/2004   Togami et al.
2007/0117458 A1*   5/2007   Winker et al. ............... 439/607

OTHER PUBLICATIONS

Sasser et al., Grounding via a Pivot Lever in a Transceiver Module, U.S. Appl. No. 11/688,753, filed Mar. 20, 2007.

Togami et al., Electromagnetic Interference Containment in a Transceiver Module, U.S. Appl. No. 11/689,379, filed Mar. 21, 2007.

Engel et al., Connector Structure for a Transceiver Module, U.S. Appl. No. 11/689,403, filed Mar. 21, 2007.

* cited by examiner

GROUNDING CLIP FOR GROUNDING A PRINTED CIRCUIT BOARD IN A TRANSCEIVER MODULE

CROSS-REFERENCE TO RELATED APPLICATIONS

This application claims priority to U.S. Provisional Patent Application Ser. No. 60/784,302, filed on Mar. 21, 2006, which is incorporated herein by reference in its entirety.

BACKGROUND OF THE INVENTION

1. The Field of the Invention

The present invention relates generally to transceiver modules. More particularly, embodiments of the invention relate to an apparatus for providing chassis ground to a printed circuit board located in a transceiver module.

2. The Related Technology

Transceiver modules often include one or more printed circuit boards with electronic circuitry that may need to be chassis grounded. In some copper transceiver modules, for instance, an inner connector structure includes a printed circuit board positioned within the connector structure. Some of the electronic circuitry of this printed circuit board may need to be chassis grounded. However, space constraints within and about the transceiver module can make this electrical grounding difficult.

Some previous attempts to chassis ground electronic circuitry within a transceiver module have provided a link to the electronic circuitry from chassis ground that is relatively distant from the electronic circuitry. However, these previous attempts have resulted in parasitic conductance becoming increasingly problematic because of the relatively lengthy link between the electronic circuitry of the printed circuit board and chassis ground.

In light of the above discussion, a need currently exists for a transceiver module that is configured to provide chassis ground to electronic circuitry on a printed circuit board within the transceiver module. In particular, there is a need for a transceiver module that is configured to provide chassis ground to electronic circuitry on a printed circuit board within the transceiver module through a relatively short link, thereby ensuring proper operation of the transceiver module.

BRIEF SUMMARY OF SOME EXAMPLE EMBODIMENTS

In general, embodiments of the invention are concerned with a transceiver module that utilizes an apparatus for providing chassis ground to a printed circuit board located within a connector structure of the transceiver module.

In one example embodiment, a ground clip for use in a transceiver module includes a cross-arm, a pair of arms connected to the cross-arm, a pair of fingers each connected to one of the pair of arms, and at least one protrusion connected to the cross-arm. Each finger is configured to be inserted into a hole in a connector structure and configured to be electrically connected to ground contacts of a printed circuit board. The at least one protrusion is configured to bias against, and make reliable electrical contact with, a portion of a transceiver module that is electrically connected to a housing of the transceiver module.

In another example embodiment, a transceiver module includes a housing, a connector structure at least partially positioned within the housing, a printed circuit board positioned within the connector structure, and a ground clip at least partially surrounding the connector structure. In this example embodiment, the housing is configured to be electrically connected to chassis ground and the printed circuit board includes electronic circuitry. Also, the ground clip includes a cross-arm, a pair of arms connected to the cross-arm, a pair of fingers each connected to one of the pair of arms, and at least one protrusion connected to the cross-arm. The fingers are each configured to be inserted into a corresponding hole in the connector structure. The fingers are also each configured to be electrically connected to a ground contact of the printed circuit board. The at least one protrusion is configured to bias against, and make reliable electrical contact with, a portion of the transceiver module that is electrically connected to the housing.

In yet another example embodiment, a transceiver module includes a housing, a connector structure at least partially positioned within the housing, a printed circuit board at least partially positioned within the connector structure, a latch mechanism at least partially positioned within the housing, and a ground clip at least partially positioned within the housing. In this example embodiment, the housing is at least partially formed from electrically conductive material, and the latch mechanism is in electrical contact with the housing. The ground clip in this example embodiment includes a first contact point electrically connected to a ground contact on the printed circuit board and a second contact point electrically connected to a portion of the latch mechanism.

These and other aspects of example embodiments of the present invention will become more fully apparent from the following description and appended claims.

BRIEF DESCRIPTION OF THE DRAWINGS

To further clarify aspects of the present invention, a more particular description of the invention will be rendered by reference to specific embodiments thereof which are disclosed in the appended drawings. It is appreciated that these drawings depict only example embodiments of the invention and are therefore not to be considered limiting of its scope. The invention will be described and explained with additional specificity and detail through the use of the accompanying drawings in which.

DETAILED DESCRIPTION OF SOME EXAMPLE EMBODIMENTS

Example embodiments of the present invention relate to a transceiver module, such as a copper transceiver module, that utilizes an apparatus for providing chassis ground to a printed circuit board located within a connector structure of the transceiver module. While described in the context of copper transceiver modules used in the field of communications networking, it will be appreciated that example embodiments of the present invention are applicable to other applications as well. For example, other types of transceiver modules, both electronic and opto-electronic, could utilize embodiments of the apparatus for providing chassis ground to a printed circuit board or other electronic circuitry that is located within the transceiver modules.

Reference will now be made to the drawings to describe various aspects of example embodiments of the invention. It is to be understood that the drawings are diagrammatic and schematic representations of such example embodiments, and are not limiting of the present invention, nor are they necessarily drawn to scale.

In the following description, numerous specific details are set forth in order to provide a thorough understanding of example embodiments of the present invention. It will be obvious, however, to one skilled in the art that the example embodiments of the present invention may be practiced without these specific details. In other instances, well-known aspects of transceiver modules have not been described in great detail in order to avoid unnecessarily obscuring the example embodiments of the present invention.

I. Example Transceiver Module

Figure 1:
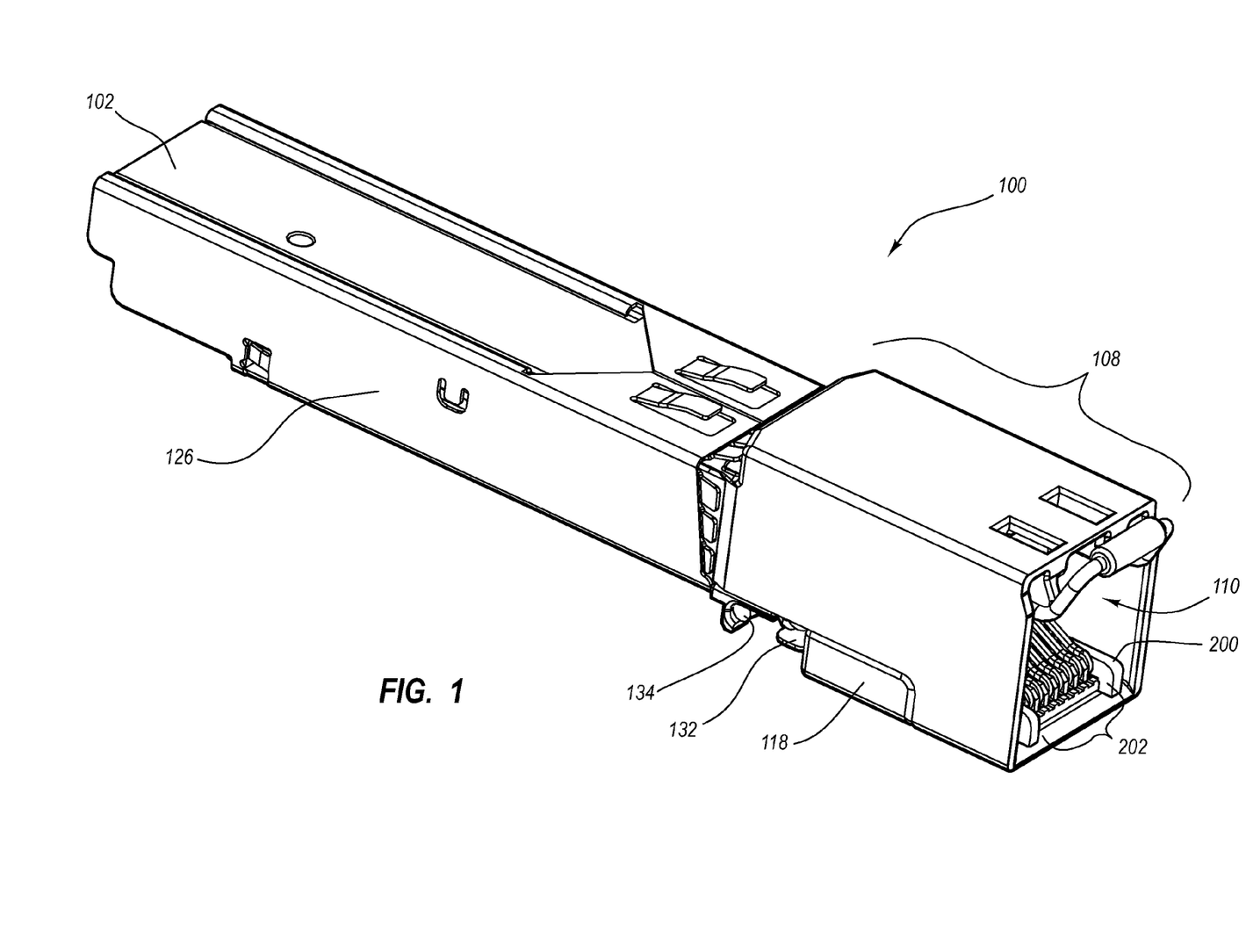
FIG. 1 is a perspective view of one example embodiment of an assembled copper transceiver module.
Figure 2:
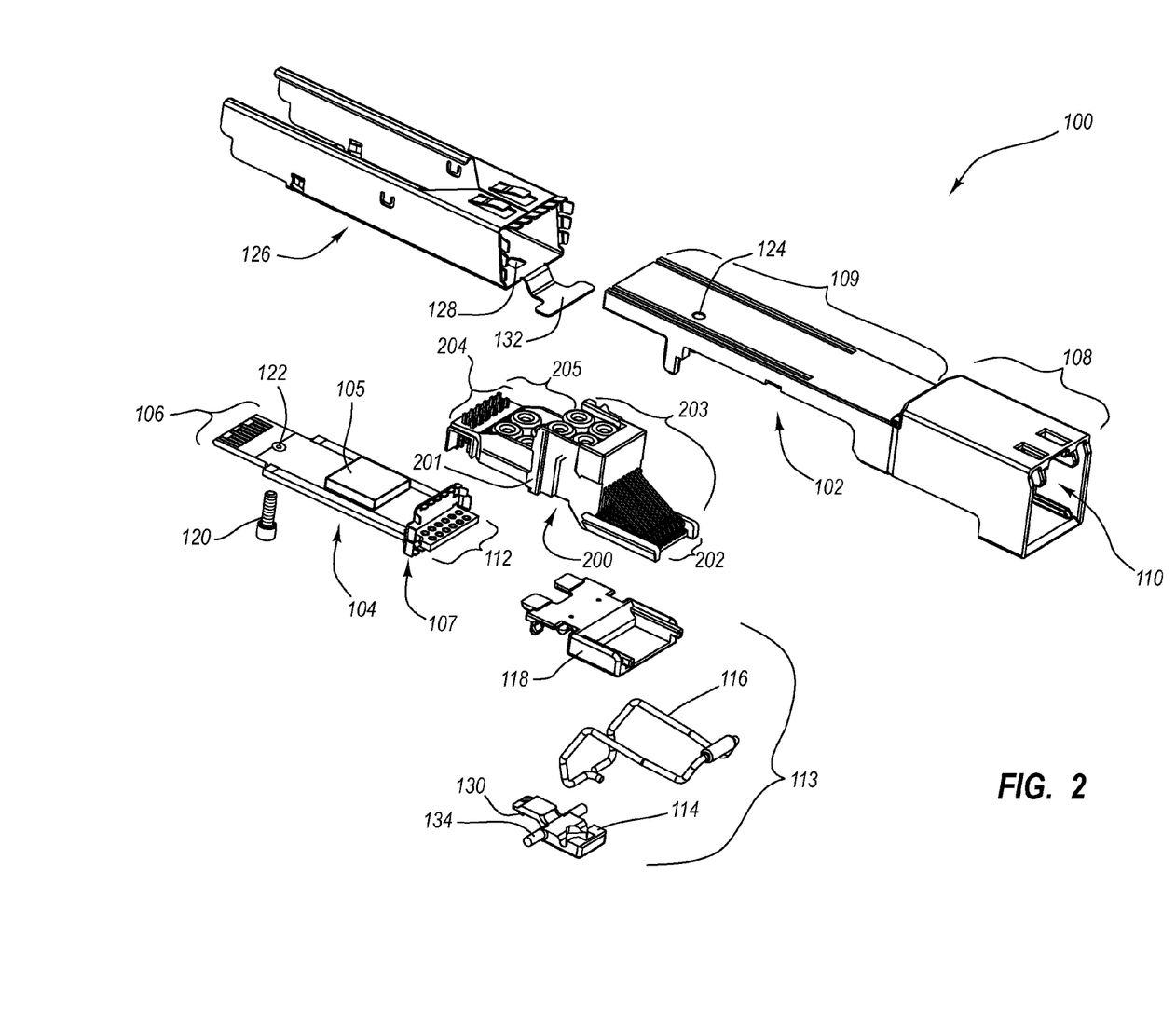
FIG. 2 is an exploded perspective view of the copper transceiver module of FIG. 1 having an example connector structure and an example latch mechanism.

Reference is first made to FIGS. 1 and 2 together, which disclose perspective views of one example embodiment of a copper transceiver module, designated generally at 100. The transceiver module 100 has a low profile. Further, a portion of the transceiver module 100 that is configured to be positioned within a host port (not shown) substantially complies with existing industry standards, including transceiver module form factor, specified in the Small Form-factor Pluggable (SFP) Transceiver MultiSource Agreement (MSA). The transceiver module 100 achieves data rates of 1.25 Gb/s, supports the 1000Base-T transmission standard (also known as the IEEE 802.3ab standard), operates between about −40° C. and about 85° C., and is pluggable. Aspects of example embodiments of the present invention can be implemented in transceiver modules having other data rates, transmission standards, and/or operating temperatures. Likewise, aspects of example embodiments of the present invention can be implemented in transceiver or other communication modules that are not pluggable.

In the disclosed example, the transceiver module 100 includes an elongated base, designated generally at 102, that is configured to support and retain a first printed circuit board 104. In this example, the printed circuit board 104 accommodates various electronic components 105 positioned thereon, and it can include differing components and circuitry configurations, depending on the type of transceiver module in which it is implemented. Also formed on the printed circuit board 104 at a rear end is an exposed edge connector 106. The edge connector 106 is configured to be electrically compatible with a corresponding electrical connector (not shown) that is positioned within the port of a host device (not shown). Other connector schemes that are well known in the art could also be used in the transceiver module 100. In addition, as disclosed in FIG. 2, the transceiver module 100 includes an EMI shield 107 that is configured so as to circumscribe a portion of the printed circuit board 104.

In the disclosed example embodiment, the base 102 can generally be divided into a connector portion, designated generally at 108, and a host port portion, designated generally at 109. The connector portion 108 is positioned at one end of the base 102 of the transceiver module 100. The connector portion 108 of the base 102 is generally the portion of the transceiver module 100 that remains on the outside of a host device (not shown) when the host port portion 109 of the base 102 and the housing 126 are operably positioned within a port of the host device (not shown). The connector portion 108 also defines an RJ-45 jack 110 that is configured to operatively receive a corresponding RJ-45 plug (not shown) of a typical copper communications cable. Other examples of jack and plug configurations include, but are not limited to, jacks and plugs compliant with registered jack ("RJ") standards such as RJ-11, RJ-14, RJ-25, RJ-48, and RJ-61 standards. The RJ-45 standard is commonly used in conjunction with copper communications cables. Examples of copper communications cables include, but are not limited to, Category 5 ("CAT-5") cables, CAT-5e cables, and CAT-6 cables. It will be appreciated that the jack 110 could be implemented to accommodate any one of a number of different connector configurations, depending on the particular application involved.

The transceiver module 100 further includes a connector structure 200. The connector structure 200 generally includes a body 201 having a first portion 203 and a second portion 205. In one example embodiment, the body 201 is a monolithic plastic component, although multi-piece non-plastic bodies are also possible. The first portion 203 of the connector structure 200 generally fits within the connector portion 108 of the base 102. The second portion 205 of the connector structure 200 generally fits within the host port portion 109 of the base 102. The connector structure 200 further includes a first plurality of conductive elements 202 attached to the body 201 that are configured to electrically connect with a corresponding plurality of electrical elements on an RJ-45 plug (not shown) when the RJ-45 plug is inserted into the RJ-45 jack 110. The connector structure 200 also includes a second plurality of conductive elements 204 attached to the body 201 that are configured to electrically connect with a corresponding plurality of plated through holes 112 on the printed circuit board 104.

The transceiver module 100 also includes a latch mechanism 113, which is made up of a pivot block 114, a bail 116, and a mounting plate 118. In one example embodiment, the latch mechanism 113 provides several functions. First, the latch mechanism 113 provides a mechanism for "latching" the transceiver module 100 within a host port (not shown) when the transceiver module 100 is operatively received within the host port. Moreover, the latch mechanism 113 also provides a convenient means for extracting the transceiver module 100 from the host port, without the need for a special extraction tool. The latch mechanism 113 is preferably implemented so as to substantially preserve the small form factor of the transceiver module 100 in accordance with prevailing standards, and in a manner that allows convenient insertion and extraction of a single transceiver module from a host port without disturbing adjacent transceiver modules or adjacent copper communications cables—even when used in a host having a high port density. Also, in an example embodiment, the latch mechanism 113 precludes inadvertent extraction of the transceiver module 100 from the host port when an RJ-45 plug is operatively received within or removed from the RJ-45 jack 110.

The mounting plate 118 includes mounting and pivot components for use in operatively interconnecting the pivot block 114, the bail 116 and the transceiver module 100. The function of the pivot block 114 and the bail 116 with respect to the mounting plate 118 within the transceiver module 100 is substantially similar to the function and operation of a pivot block 310 and a bail 308 with respect to a mounting plate 314 within a module 300 as disclosed in connection with FIGS. 5 and 6 of U.S. Patent Application Publication No. "2004/0161958 A1" titled "Electronic Modules Having Integrated Lever-Activated Latching Mechanisms," published Aug. 19, 2004, which is incorporated herein by reference in its entirety.

As disclosed in FIG. 2, after the connector structure 200 is operably connected to the printed circuit board 104 and operably assembled within the base 102, the mounting plate 118 partially encloses the connector structure 200 within the connector portion 108 of the base 102. The mounting plate 118 is made from an electrically conductive material, as is the base 102. Therefore, after the assembly of the transceiver module 100, when the base 102 is grounded, for example to chassis ground through the housing 126, the mounting plate 118 is also necessarily grounded because of the secure electrical attachment of the mounting plate 118 to the connector portion 108 of the base 102. The printed circuit board 104 is also secured to the base 102 with a fastener 120 which passes through an opening 122 in the printed circuit board 104 and into an opening 124 in the base 102.

FIGS. 1 and 2 disclose how the base 102 and the printed circuit board 104 are at least partially enclosed and retained within a housing, designated generally at 126. The housing 126 is generally rectangular in cross-sectional shape so as to accommodate the base 102. The housing 126 includes an opening at its rear end so as to expose the edge connector 106 and thereby permit it to be operatively received within a corresponding electrical connector slot (not shown) within a host port of a host device (not shown). In one example embodiment, the housing 126 is formed of a conductive material such as sheet metal.

In an example embodiment, the housing 126 is configured so as to accommodate the latch mechanism 113 of the transceiver module 100. For example, a bottom surface of the housing 126 includes a locking recess 128, which is sized and shaped to expose a lock pin 130 of the pivot block 114 when the latch mechanism 113 is assembled within the transceiver module 100 and is in a latched position. Also, the housing 126 includes a means for biasing the latch mechanism 113 to a latched position. By way of example, in one example embodiment, the biasing means can be a resilient metal portion of the housing 126 that is formed as a leaf spring 132. When the transceiver module 100 is operably assembled, the leaf spring 132 can be biased against a top surface of the pivot block 114 so as to operatively secure the pivot block 114 in its assembled position. Also, the biasing action can be applied so as to urge the pivot block 114 in a rotational direction about a pivot point 134 so as to expose the lock pin 130 through the locking recess 128, which corresponds to the transceiver module 100 being in a latched position.

II. Example Connector Structure

Figure 3:
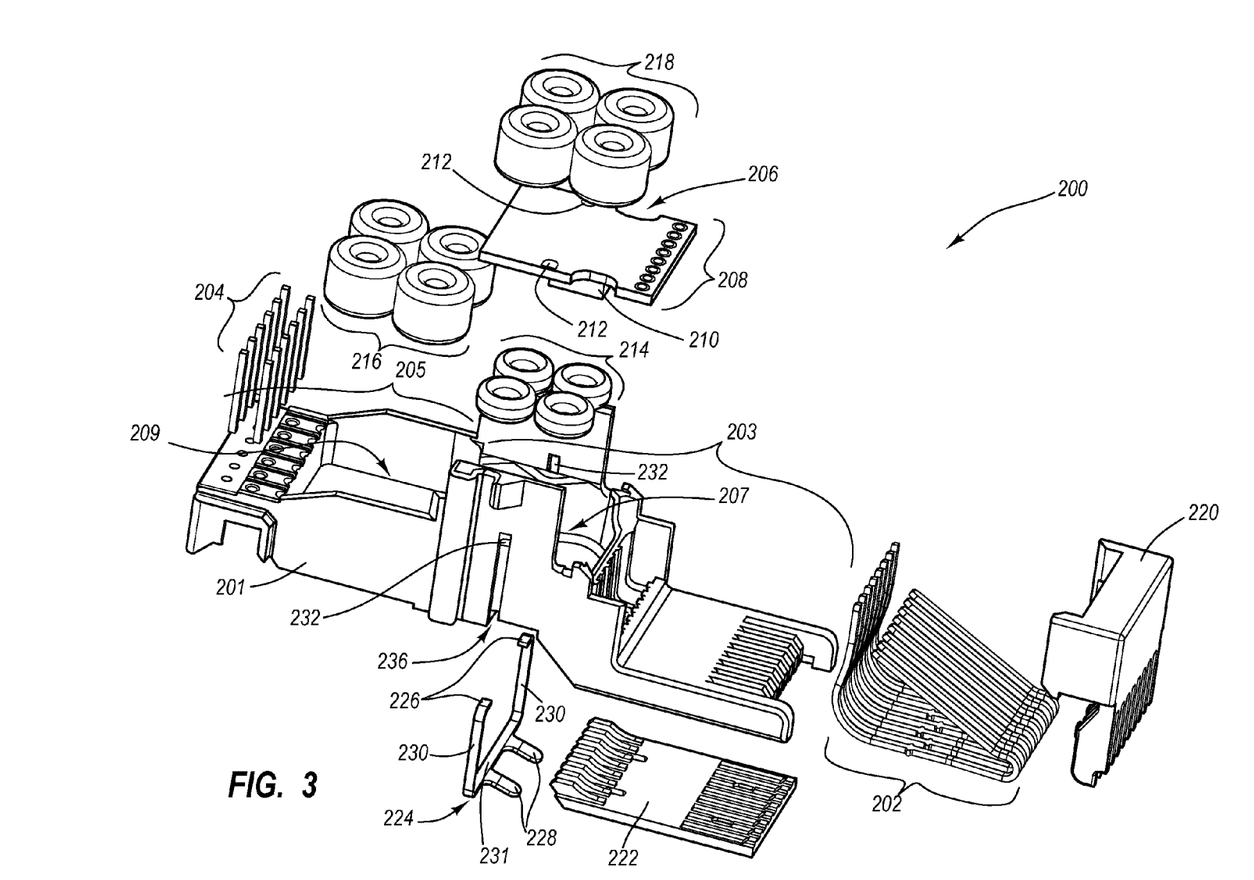
FIG. 3 is an exploded perspective view of the connector structure of FIG. 2.
Figure 4:
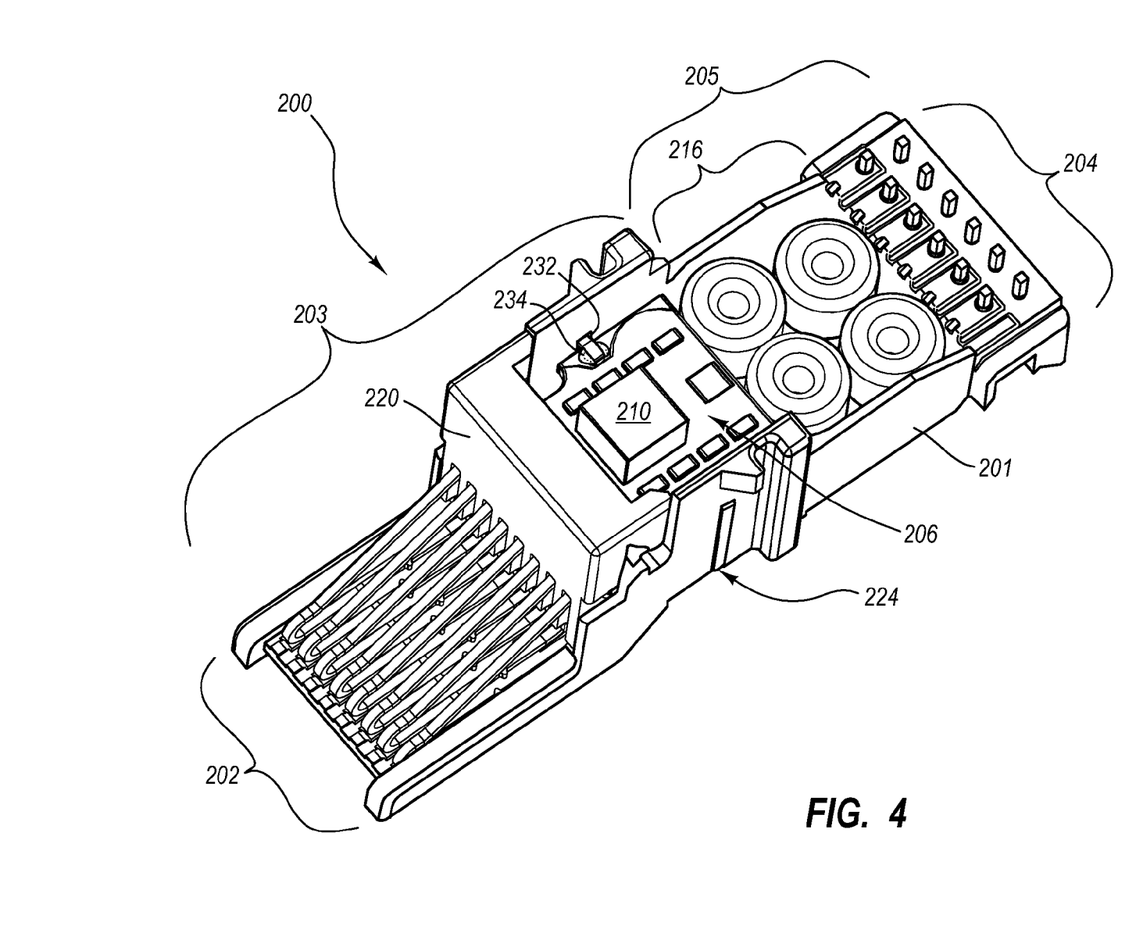
FIG. 4 is an assembled perspective view of the top side of the connector structure of FIGS. 2 and 3.

Reference is now made to FIGS. 3 and 4 together, which disclose perspective views of the example connector structure 200 of FIG. 2. FIG. 3 is an exploded perspective view of the connector structure 200 and FIG. 4 is an assembled perspective view of the connector structure 200. As disclosed previously, the connector structure 200 includes a first plurality of conductive elements 202 and a second plurality of conductive elements 204 attached to the body 201. The connector structure 200 also includes a printed circuit board 206 that is sized and configured to be positioned within a first cavity 207 formed in the first portion 203 of the body 201 of the connector structure 200. The printed circuit board 206 includes a plurality of plated through holes 208 that correspond to the first plurality of conductive elements 202. When the connector structure 200 is operably assembled, each of the conductive elements 202 is received by a respective one of the plated through holes 208 such that an electrical connection between the conductive elements 202 and the plated through holes 208 is achieved. The printed circuit board 206 also includes electronic circuitry 210 and ground contacts 212.

As disclosed previously, the conductive elements 204 are configured in the example embodiment as pins that engage the corresponding plated through holes 112 of the printed circuit board 104. The conductive elements 202 and 204, together with their corresponding plated through holes 208 and 112, respectively, define a portion of a plurality of conductive pathways that electrically couple the jack 110, where a communications cable plug is received, to a host device within which the transceiver module 100 is received.

The connector structure 200 also includes electrical cores 214, 216, and 218. In one example embodiment, the connector structure 200 is configured to accommodate either eight electrical cores or twelve electrical cores. When the connector structure 200 includes only eight electrical cores, as shown in FIG. 4, the electrical cores 214 are positioned in the first cavity 207, and the electrical cores 216 are positioned in a second cavity 209 defined in the second portion 205, while the printed circuit board 206 is positioned on top of the electrical cores 214 such that the side of the printed circuit board 206 that includes the electronic circuitry 210 is facing up (the "eight-core position"). When the connector structure 200 includes twelve electrical cores, as shown in FIG. 3, the electrical cores 214 and the electrical cores 218 are positioned in the first cavity 207, and the electrical cores 216 are positioned in a second cavity 209, while the printed circuit board 206 is flipped over and positioned between the electrical cores 214 and the electrical cores 218 such that the electronic circuitry 210 is facing down (the "twelve-core position").

The plated through holes 208 and the ground contacts 212 of the printed circuit board 206 are designed to accommodate the printed circuit board 206 being positioned in either the eight-core position or the twelve-core position. In particular, the plated through holes 208 extend through the printed circuit board 206. The ground contacts 212 also extend through the printed circuit board 206 such that the ground contacts 212 can be accessed on either side of the printed circuit board 206. The ability of the printed circuit board 206 to be positioned in either the eight-core position or the twelve-core position allows for more effective use of the space within the connector structure 200. Specifically, this multi-positioning ability of the printed circuit board 206 allows for the electrical cores 218 to be stacked above the electrical cores 214 in the connector structure 200 when the connector structure 200 includes twelve electrical cores.

The connector structure 200 also includes mounting brackets 220 and 222, which secure the conductive elements 202 to the connector structure 200. The mounting brackets 220 and 222 are also designed to properly align the conductive elements 202 for electrical connection with corresponding conductive elements of an RJ-45 plug (not shown) when the RJ-45 plug is inserted into the RJ-45 jack 110 of the transceiver module 100, as disclosed in FIGS. 1 and 2.

In accordance with one example embodiment of the invention, the connector structure 200 also includes an example ground clip 224. The example ground clip 224 is generally symmetrical, as disclosed in FIG. 3, although non-symmetrical embodiments of the ground clip 224 are also possible. The example ground clip 224 is composed of stainless steel with a nickel-gold plating, although other electrically conductive materials would also be suitable. In greater detail, the ground clip 224 includes fingers 226, two protrusions 228, arms 230, and a cross-arm 231. The arms 230 and the cross-arm 231 electrically and mechanically connect the fingers 226 to the protrusions 228. In one example embodiment, the arms 230 are each about 6 mm in length and the cross-arm 231 is about 10 mm in length, although other lengths are possible and contemplated. The fingers 226 are designed and positioned to be inserted into holes 232 of the connector structure 200. After being inserted into the holes 232, the fingers 226 of the ground clip 224 can be electrically and mechanically connected to the ground contacts 212 of the printed circuit board 206. For example, one method of electrically and mechanically connecting the fingers 226 to the ground contacts 212 is solder. A finger 226 is shown soldered to a ground contact 212 at a solder point 234 in FIG. 4.

The connector structure 200 also includes grooves 236. The grooves 236 extend along the outside side surfaces of the connector structure 200 from the holes 232 to the bottom of the connector structure 200. The width and depth of the grooves 236 are substantially the same as the width and depth of the arms 230. When the fingers 226 are placed in the holes 232 and when the arms 230 are placed in the grooves 236, the outside surfaces of the arms 230 are substantially flush with the outside surfaces of the connector structure 200 on either side of the grooves 236. The flush mounting of the arms 230 of the ground clip 224 within the grooves 236 allows for the unimpeded movement of the bail 116 within the transceiver module 100.

When the ground clip 224 is operably positioned around the connector structure 200 and operably connected to the printed circuit board 206, the mechanical connection between the fingers 226 and the ground contacts 212 functions to hold the printed circuit board 206 in place within the connector structure 200. Specifically, the clip 224 substantially prevents the printed circuit board 206 from vertical and horizontal displacement from its intended position within the body 201 of the connector structure 200. In one example embodiment, the printed circuit board 206 is also mechanically supported by resting on top of the electrical cores 214. Additional details regarding the structure and function of the connector structure 200 can he found in co-pending U.S. patent application Ser. No. 11/689,403, titled "CONNECTOR STRUCTURE FOR A TRANSCEIVER MODULE," which is filed concurrently herewith and incorporated herein by reference in its entirety.

Figure 5:
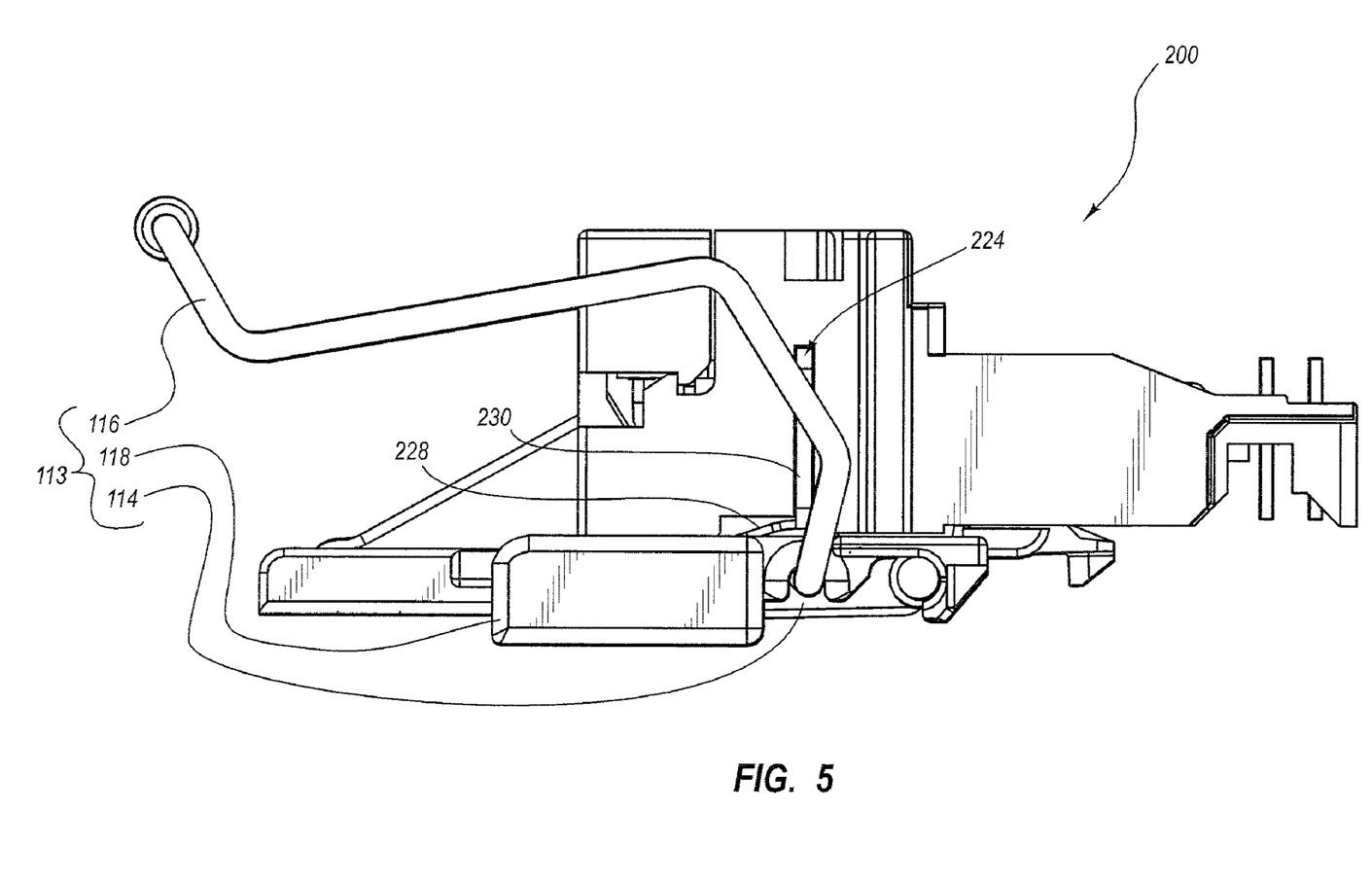
FIG. 5 is a side view of the connector structure of FIGS. 2 and 3, assembled, and the example latch mechanism of FIG. 2.

With continuing reference to FIGS. 3 and 4, and with reference also to FIG. 5, the ground cup 224 also serves to electrically ground portions of the printed circuit board 206 to chassis ground. Specifically, the protrusions 228 of the ground clip 224 are positioned so that when the mounting plate 118 of the latch mechanism 113 is operably connected to the base 102, the protrusions 228 are biased against the mounting plate 118. As disclosed in FIGS. 3 and 5, each of the protrusions 228 is angled slightly downward, according to the orientations of FIGS. 3 and 5, to assist in the biasing against the mounting plate 118. This biasing of the protrusions 228 against the mounting plate 118 assures that the protrusions 228 will reliably remain in constant electrical contact with the mounting plate 118 despite minor variances in the size or positioning of the mounting plate 118, the connector structure 200, and/or the base 102 when the transceiver module 100 is assembled (see FIGS. 1 and 2). As disclosed herein, the mounting plate 118 is grounded through the connector portion 108 of the base 102 to chassis ground see (FIG. 1). Therefore, the electrical connection between the protrusions 228 and the mounting plate 118 serves to ground the printed circuit board 206 to chassis ground. This chassis-grounding of the printed circuit board 206 is achieved through the ground clip 224 without interfering with the various components and mechanisms present in the connector portion 108 of the base 102.

The grounding of the printed circuit board 206 to chassis ground using the ground clip 224 helps to deal with electrical noise that is transmitted via a copper communications cable (not shown) that is plugged into the jack 110. The ground clip 224 operates in conjunction with a common mode choke (not shown) that is integrated into the circuitry of the transceiver module 100. Specifically, a center tap of each of the electrical cores 214 and 218 is terminated with the even mode impedance of the copper communications cable. Each center tap includes a termination with a resistor and capacitor. Any common mode noise from the copper communications cable will feed into the center taps. The ground clip 224 allows this common mode noise to be transferred from the center taps to chassis ground.

In greater detail, the ground clip 224 ties the resistor and capacitor of each of the electrical cores 214 and 218 to chassis ground with less parasitic conductance than other implementations. The ground clip 224 also avoids the problems associated with tying signal ground and chassis ground together. The ground clip 224 further avoids problems associated with running a ground trace from the printed circuit board 206 further into the rear of the transceiver module 100. Further, the ground clip 224 enables a termination substantially similar to the termination disclosed in U.S. Pat. No. "5,321,372" titled "Apparatus and Method for Terminating Cables to Minimize Emissions and Susceptibility," which issued on Jun. 14, 1994, and which is incorporated herein by reference in its entirety. The termination enabled by the ground clip 224 exhibits superior characteristics over other present implementations. This in turn enhances the electrical robustness of the transceiver module 100 and provides for improved electrical characteristics thereof.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A ground clip for use in a transceiver module, the ground clip comprising:
   a cross-arm;
   a pair of arms connected to the cross-arm;
   a pair of fingers each connected to one of the pair of arms, each finger being configured to be inserted into a hole in a connector structure of the transceiver module and configured to be electrically connected to ground contacts of a printed circuit board that is at least partially positioned within the connector structure; and
   at least one protrusion connected to the cross-arm, the at least one protrusion being configured to bias against and make reliable electrical contact with a portion of the transceiver module that is configured to be electrically connected to a chassis ground of a host device when the transceiver module is positioned in a port of the host device.

2. The ground clip as recited in claim 1, wherein the cross arm and the pair of arms connected to the cross-arm form a substantially U-shaped component.

3. The ground clip as recited in claim 2, wherein the pair of fingers generally extend toward one another.

4. The ground clip as recited in claim 1, wherein the ground clip comprises stainless steel with nickel-gold plating.

5. A transceiver module for use in a communications network, the transceiver module comprising:
   a housing configured to be electrically connected to a chassis ground of a host device when the transceiver module is positioned in a port of the host device;

a connector structure at least partially positioned within the housing;

a printed circuit board positioned within the connector structure, the printed circuit board including electronic circuitry; and a ground clip at least partially surrounding the connector structure, the ground clip comprising:

a cross-arm;

a pair of arms connected to the cross-arm;

a pair of fingers each connected to one of the pair of arms, each finger extending into a corresponding hole in the connector structure and electrically connected to a ground contact of the printed circuit board; and at least one protrusion connected to the cross-arm, the at least one protrusion biased against and in reliable electrical contact with the housing or a portion of the transceiver module that is electrically connected to the housing.

6. The transceiver module as recited in claim 5, wherein a portion of the transceiver module that is configured to be positioned within a host port substantially conforms to the Small Form-factor Pluggable (SFP) Transceiver MultiSource Agreement (MSA).

7. The transceiver module as recited in claim 5, wherein the transceiver module is configured to achieve data rates of about 1.25 Gb/s.

8. The transceiver module as recited in claim 5, wherein the transceiver module substantially supports the 1000Base-T transmission standard.

9. The transceiver module as recited in claim 5, wherein the transceiver module is configured to operate between about −40° C. and about 85° C.

10. The transceiver module as recited in claim 5, wherein the portion of the transceiver module that is electrically connected to the housing comprises a latch mechanism attached to the housing, the latch mechanism configured to latch the transceiver module within a port of the host device.

11. The transceiver module as recited in claim 5, wherein the fingers of the ground clip are soldered to the ground contacts of the printed circuit board.

12. The transceiver module as recited in claim 5, wherein the connector structure defines grooves in which the arms of the ground clip are at least partially positioned.

13. The transceiver module as recited in claim 5, wherein the electrical connection between the fingers of the ground clip and the ground contacts of the printed circuit board is also configured to substantially prevent vertical or horizontal displacement of the printed circuit board within the connector structure.

14. The transceiver module as recited in claim 5, further comprising a plurality of electrical cores positioned within the connector structure proximate the printed circuit board.

15. The transceiver module as recited in claim 14, wherein the printed circuit board is electrically connected to the plurality of electrical cores such that common mode noise from the plurality of electrical cores can transfer through the printed circuit board to the ground clip.

16. The transceiver module as recited in claim 5, wherein the ground clip is configured to operate in conjunction with a common mode choke that is integrated into the electronic circuitry included in the printed circuit board.

17. A transceiver module comprising:

a housing comprising electrically conductive material;

a connector structure at least partially positioned within the housing;

a printed circuit board at least partially positioned within the connector structure;

a latch mechanism attached to and in electrical contact with the housing, the latch mechanism configured to latch the transceiver module within a port of a host device; and a ground clip at least partially surrounding the connector structure and at least partially positioned within the housing, the ground clip comprising:

a first contact point electrically connected to a ground contact on the printed circuit board; and a second contact point electrically connected to a portion of the latch mechanism.

18. The transceiver module as recited in claim 17, wherein the first contact point of the ground clip comprises a finger that is inserted into a hole in the connector structure.

19. The transceiver module as recited in claim 18, wherein the second contact point of the ground clip comprises a protrusion in electrical contact with the finger, the protrusion being biased against a mounting plate of the latch mechanism, the mounting plate being attached to and in electrical contact with the housing.

20. The transceiver module as recited in claim 18, wherein the electrical contact between the finger of the ground clip and the ground contact of the printed circuit board is also configured to substantially prevent vertical or horizontal displacement of the printed circuit board within the connector structure.

* * * * *

UNITED STATES PATENT AND TRADEMARK OFFICE
CERTIFICATE OF CORRECTION

PATENT NO. : 7,452,218 B2
APPLICATION NO. : 11/689351
DATED : November 18, 2008
INVENTOR(S) : Sasser et al.

It is certified that error appears in the above-identified patent and that said Letters Patent is hereby corrected as shown below:

Column 7
Line 34, change "can he found" to --can be found--
Line 39, change "ground cup 224" to --ground clip 224--
Line 56, change "ground see (FIG. 1)." to --ground (see FIG. 1).--

Signed and Sealed this
Twenty-second Day of February, 2011

David J. Kappos
*Director of the United States Patent and Trademark Office*